United States Patent [19]

Cadle et al.

[11] Patent Number: 5,698,014
[45] Date of Patent: Dec. 16, 1997

[54] LIQUID CARRYOVER CONTROL FOR SPIRAL GAS LIQUID SEPARATOR

[75] Inventors: Richard A. Cadle, Arlington; Richard L. Payne, McKinney, both of Tex.

[73] Assignee: Atlantic Richfield Company, Los Angeles, Calif.

[21] Appl. No.: 606,292

[22] Filed: Feb. 23, 1996

[51] Int. Cl.$^6$ .................................... B01D 19/00
[52] U.S. Cl. ....................... 96/157; 55/456; 96/158; 96/216; 166/357; 210/512.1
[58] Field of Search .................... 210/87, 97, 109, 210/123, 188, 512.1, 86; 96/156, 158, 216, 157; 55/274, 456, 457; 166/75.12, 105.5, 357; 137/202, 403, 422, 429, 430, 433, 434, 435

[56] References Cited

U.S. PATENT DOCUMENTS

| | | | |
|---|---|---|---|
| 1,327,691 | 1/1920 | Ballard. | |
| 1,471,088 | 10/1923 | Ballard | 55/456 |
| 4,762,176 | 8/1988 | Miller | 166/105.5 |
| 5,113,671 | 5/1992 | Westermeyer | 55/456 |
| 5,209,765 | 5/1993 | Kolpak et al. | 96/157 |
| 5,288,312 | 2/1994 | Payne et al. | 96/158 |
| 5,343,945 | 9/1994 | Weingarten et al. | 166/105.5 |
| 5,431,228 | 7/1995 | Weingarten et al. | 166/357 |
| 5,570,744 | 11/1996 | Weingarten et al. | 210/512.1 |

OTHER PUBLICATIONS

SPE 30637 Paper, Weingarten, J.S. et al., "New Design for Compact Liquid-Gas Partial Separation: Downhole and Surface Installations for Artificial Lift Applications", presented at the SPE Annual Technology Conference and Exhibition in Dallas, Texas, Oct. 22, 1995.

*Primary Examiner*—Joseph W. Drodge
*Attorney, Agent, or Firm*—Michael E. Martin

[57] ABSTRACT

A spiral or auger type gas-liquid separator, particularly for well production fluid flow, includes a vertically oriented conduit section having a spiral separator element disposed therein and around a central gas discharge conduit. The inlet to the gas discharge conduit is disposed adjacent the discharge end of the separator element and includes a liquid carryover control mechanism comprising a closure member which is operable to shut off fluid flow into the gas discharge conduit when high liquid flow rates or liquid slug flow passes through the separator. The shutoff closure member is connected to a float actuator responsive to liquid accumulation to actuate the closure member to move to a closed position. A coil spring biases the closure member toward a valve open condition. The float actuator includes cooperating telescoping members, one supporting the closure member and the other member comprising a flotation member, and a coil spring interposed between the two members to absorb impact forces due to rapid movement of the actuator to minimize damage to the closure member or its seat.

18 Claims, 2 Drawing Sheets

LIQUID CARRYOVER CONTROL FOR SPIRAL GAS LIQUID SEPARATOR

BACKGROUND OF THE INVENTION

1. Field of the Invention

The present invention pertains to a spiral or auger type gas-liquid separator including a float actuated shut-off valve to prevent liquid carryover into the gas discharge conduit of the separator during periods of exceedingly high liquid flow, including so-called slug flow.

2. Background

In hydrocarbon fluid production and processing operations, it is quite common to address the problem of handling combined gas and liquid flow. In particular, the fluid produced from subterranean wells in many oil and gas fields will typically be a combination of gas and liquid emanating from the wells and requiring conduction away from the wells through respective flowlines. In many hydrocarbon production fields, the portion of the fluid flow which is gas is substantial. It is not unusual to have a so-called gas void fraction (the percent of gas by volume in the combined flow stream) in the range of 90% to 99%. Separation of the gas from the liquid is necessary and desirable for several reasons including monitoring reservoir conditions, making accurate flow measurements, fluid processing requirements and regulatory requirements, for example.

In production fields which are producing large volumes of gas at relatively high pressure, the gas may be reinjected into the reservoir for stimulation purposes and/or into wells which are rigged for artificial fluid lift applications. To this end, it is desirable to separate gas from liquid near the respective production wellheads. Spiral or so-called auger type separator systems have been developed for placement in a well and in surface flowlines leading from a well or interposed in other parts of fluid process systems. Separator systems incorporating the auger or spiral type separator element are described and claimed in U.S. Pat. No. 5,431,228 issued Jul. 11, 1995 to Weingarten et al. and in U.S. patent application Ser. No. 08/442,946, filed May 17, 1995 by Weingarten et al., now U.S. Pat. No. 5,570,744, both assigned to the assignee of the present invention. The compact inline arrangement of the spiral separator mechanisms provides many advantages for separation of fluid flow streams having a relatively high proportion of gas or a high gas-to-liquid ratio in the flowstream.

However, one problem associated with the use of the spiral or auger type separator is realized when the occasional and uncontrollable change in the gas to liquid ratio occurs such as when so-called slugs of liquid may be produced from a well or may otherwise occur in the flowline in which the separator is disposed. In such instances, the structural configuration of the auger-type separator will not provide, by itself, for minimizing liquid carryover into the gas discharge conduit. However, minimal liquid carryover is required in many process applications to prevent significant liquid flow through the gas discharge conduit leading from the separator. It is to this end that the present invention has been developed.

SUMMARY OF THE INVENTION

The present invention provides an improved spiral or auger type gas-liquid separator including a liquid carryover control mechanism to minimize liquid carryover into the gas discharge conduit leading from the separator.

In accordance with an important aspect of the present invention, a spiral or auger type gas-liquid separator system is provided having a gas-liquid flow conduit having spiral or auger type separator elements disposed therein, wherein the separator includes a gas discharge conduit for conducting gas away from the separator along the central axis of the separator system and the inlet to the gas discharge conduit is provided with a flow control valve responsive to liquid accumulation in the conduit downstream of the separator elements to substantially prevent liquid flow into the gas discharge conduit. In particular, the liquid carryover control comprises a valve closure member operable to close over a seat disposed in the gas discharge conduit. The closure member is connected to a float member responsive to accumulation of liquid in the liquid discharge conduit from the separator to effect closure to minimize liquid carryover into the gas discharge conduit. The valve closure member may be configured to be responsive to buoyant forces to move to a closed position in opposition to a biasing force which tends to hold the closure member in a valve open position so that fluid pressure differential forces do not maintain the valve in a closed position once the buoyant force has been removed.

In accordance with another aspect of the invention, a liquid carryover control mechanism is provided for a spiral or auger type separator wherein a valve closure member is connected to a float member responsive to accumulation of liquid in a generally vertically oriented conduit section of the separator to effect movement to shutoff fluid flow through the gas discharge conduit to prevent or minimize liquid carryover into the gas discharge conduit.

Still further, the invention provides an improved spiral or auger type gas-liquid separator system having a liquid carryover control device comprising a float actuated closure member for closing off the inlet to the gas discharge conduit, which closure member is connected to a float mechanism which includes a shock absorber to minimize damage to the closure member as a result of rapid accumulation of liquid and response of the float actuator thereto.

The above-described features and advantages of the invention together with other superior aspects thereof will be further appreciated by those skilled in the art upon reading the detailed description which follows in conjunction with the drawing.

DESCRIPTION OF PREFERRED EMBODIMENTS

Figure 1:
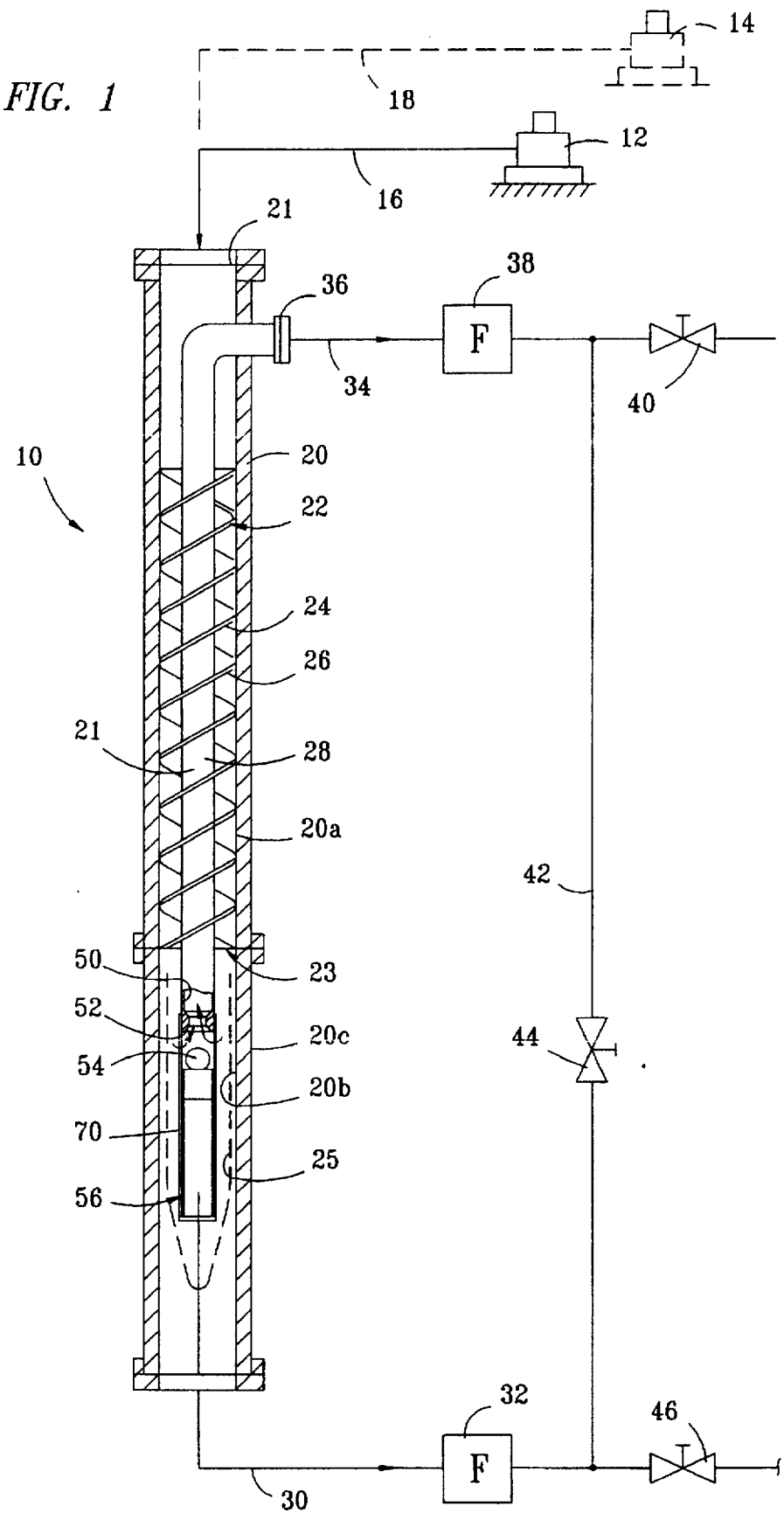
FIG. 1 is a diagram, in somewhat schematic form, of a separator system including the liquid carryover control mechanism of the present invention.

In the description which follows, like parts are marked throughout the specification and drawing with the same reference numerals, respectively. The drawing figures are not necessarily to scale and conventional elements may be shown in somewhat schematic or generalized form in the interest of clarity and conciseness.

Referring to FIG. 1, there is illustrated a gas-liquid separator system, including the liquid carryover control mechanism in accordance with the invention, and generally designated by the numeral 10. The separator system 10 is particularly adapted, although not limited, to separating gas from liquid being produced from one or more hydrocarbon production wells 12 and 14, for example. Flowlines 16 and 18, leading from the wells 12 and 14, respectively, are connected to a generally vertically extending conduit section 20 for conducting a gas-liquid mixture thereto. The conduit section 20 is a generally cylindrical elongated pipe having suitably secured therein a spiral or auger type separator element, generally designated by the numeral 22. The separator element 22 includes double helical or spiral baffles 24 and 26 which are formed of relatively thin metal plates which are disposed around a central axially extending support comprising a gas discharge conduit 28 and are suitably secured thereto. The conduit section 20, the gas discharge conduit 28 and the separator element 22, preferably, have a common central longitudinal axis 21, FIG. 1.

The separator element 22 is suitably retained in the conduit section 20 and is operable to effect substantial separation of gas from liquid, particularly in flowstreams having a relatively high gas void fraction. As the multiphase fluid flowstream enters the conduit section 20 from the upper or inlet end 21 and flows toward a discharge end 23, the spiral flowpath of the flowstream effects centrifugal force on the liquid to force it toward the interior wall 20a of the conduit section 20 while gas tends to flow along and adjacent to the outer wall surface of the gas discharge conduit 28. As the flowstream leaves the separator element 22, the liquid flow tends to continue along an inner wall 20b of an extension of the conduit section 20, generally designated by the numeral 20c. The inner boundary of the liquid layer, is typically that indicated by the dashed line 25 in FIG. 1.

A liquid discharge conduit 30 is connected to the separator section comprising the conduits 20 and 20c and has a suitable flow meter 32 interposed therein. In like manner, the gas discharge conduit 28 projects through the conduit section 20 in sealed engagement therewith and is connected to a conduit 34 at a suitable coupling 36. The conduit 34 may also have a gas measuring flow meter 38 interposed therein, as shown. Gas may be conducted separately through the conduit 34 under control of a suitable flow control valve 40 for various uses including further compression and reinjection into a reservoir to stimulate production of fluids therefrom or, with or without further compression, use in other production wells for artificial gas lift applications, for example. The gas may be conducted separately to other processes known to those skilled in the art. Alternatively, the gas flowstream may be recombined with the liquid flowstream by conducting the gas flow through a conduit section 42 interconnecting the conduits 34 and 30, as shown in FIG. 1. Suitable flow control valves 44 and 46 are interposed in the conduits 42 and 34 for controlling fluid flow therethrough.

One major requirement for separation of gas from liquid flow in hydrocarbon fluid production flowstreams is to provide for suitable measurement of the liquid flow by the meter 32. Conventional flow meters are relatively accurate if the gas component of the combined flowstream does not exceed about 70% by volume. Accordingly, if the separator system 10 is utilized merely to provide for flow measurement accuracy, the gas may be recombined with the liquid flow after measurement of liquid flow by the flow meter 32. On the other hand, if gas is to be separated for other applications, it is desirable to measure gas mass or volume flow rate at the meter 38 also.

In many instances, the liquid flow rate entering the conduit section 20 may become excessive. Many fluid production wells, for example, will produce so-called slug flow wherein occasional relatively large quantities or slugs of liquid are discharged into the flowlines 16 and/or 18. In such instances, the spiral or auger type separator element 22 may be overwhelmed and the volume of liquid so high that virtually no gas is instantly present in the separator system or separation of gas from liquid may not be possible. Normally, of course, a gas flowstream is being conducted through the conduit sections 20 and 20c inside the diameter of the layer of liquid indicated by the line 25 and which gas may enter the gas discharge conduit 28 at its inlet end 50. In accordance with the present invention, the inlet end 50 of the gas discharge conduit is modified to have a valve closure seat 52 formed thereon for engagement with a float actuated closure member 54 to substantially prevent injection of liquid into the gas discharge conduit 28.

Figure 2:
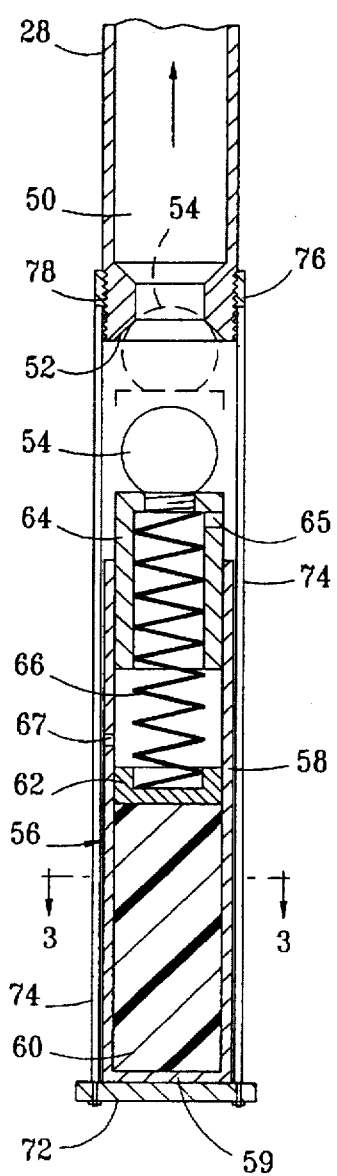
FIG. 2 is a longitudinal central section view of the liquid carryover control mechanism including the closure and float actuator members.
Figure 3:
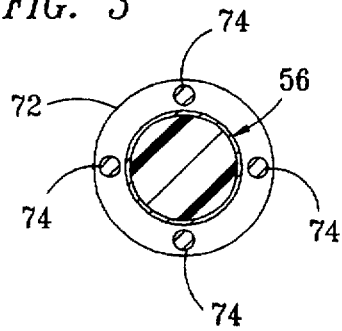
FIG. 3 is a section view taken generally along the line 3—3 of FIG. 2.

Referring also to FIGS. 2 and 3, the liquid carryover control mechanism of the invention includes the closure member 54 which may have a suitable configuration such as a somewhat spherical shape, as illustrated, for engagement with the seat 52 to prevent fluid flow into the conduit 28. The closure member 54 is connected to a float type actuator, generally designated by the numeral 56, which is responsive to accumulation of liquid in the conduit section 20c to exert buoyant forces on the closure member 54 to engage the seat 52. Thus, with the particular liquid carryover control mechanism of the invention, both conduit sections 20 and 20c are preferably oriented generally vertically so that the buoyant forces exerted on the closure member 54 are effective to move it from its normally open position illustrated in FIGS. 1 and 2 to a closed position, as indicated by the alternate position lines in FIG. 2.

A preferred embodiment of the actuator 56 comprises an elongated, generally cylindrical outer housing 58 which is at least partially filled with a suitable flotation material, such as a low density foamed polymer 60. The housing 58 is formed as a cylindrical sleeve having a transverse bottom wall 59 and an intermediate transverse wall 62 forming a closure for containing the flotation material 60. The actuator 56 further includes an upper, generally cylindrical tubular closure member support part 64 which is adapted to be suitably connected to the closure member 54 and which is adapted for axial sliding movement within the housing member 58. Suitable shock absorbing means, such as a coil compression spring 66, is retained within the actuator 56 between the closure member support part 64 and the transverse wall 62, as illustrated.

The actuator 56 is supported on the gas discharge conduit 28 by an elongated cage member 70 comprising a transverse bottom plate 72 and circumferentially spaced apart support rods 74, see FIG. 3 also. The rods 74 may be threadedly connected to the plate 72 and suitably connected to a connecting ring 76 at their opposite ends. The ring 76 may be constructed for threaded engagement at 78 with the gas discharge conduit 28 at the inlet end 50.

Accordingly, in response to accumulation of liquid in the conduit section 20c, the actuator 56 is operable to bias the closure member 54 into engagement with the seat 52, rather rapidly, to prevent flow of liquid into the gas discharge conduit 28. Thanks to the provision of the actuator 56, as described and shown herein, rapid and/or repeated accumulation of liquid in the conduit section 20c will force the closure member 54 into engagement with the seat 52 somewhat rapidly. In order to minimize impact forces exerted by the closure member 54 on the seat 52 and caused by the actuator 56, the shock absorbing feature provided by the coil spring 66 is particularly advantageous to improve the life of the liquid carryover control mechanism. Fluid vent ports 65 and 67 are preferably provided in the respective support part 64 and actuator housing 58 to vent fluid from a cavity 69 formed between the support part and the housing during the telescoping action between the support part and the housing. The ports 65 and 67 may, in fact, operate as a fluid flow control to absorb the energy of the actuator 56 as the housing 58 moves rapidly upwardly toward the seat 52 to at least assist the spring 66 in its shock absorbing operation. In other words, as the actuator 56 moves the closure member 54 toward the seat 52, the continued movement of the housing 58 in telescoping relationship around the part 64 will result in forced but limited flow of liquid through the ports 65 and/or 67 to minimize forcible impacting of the closure member 54 against the seat 52.

Figure 4:
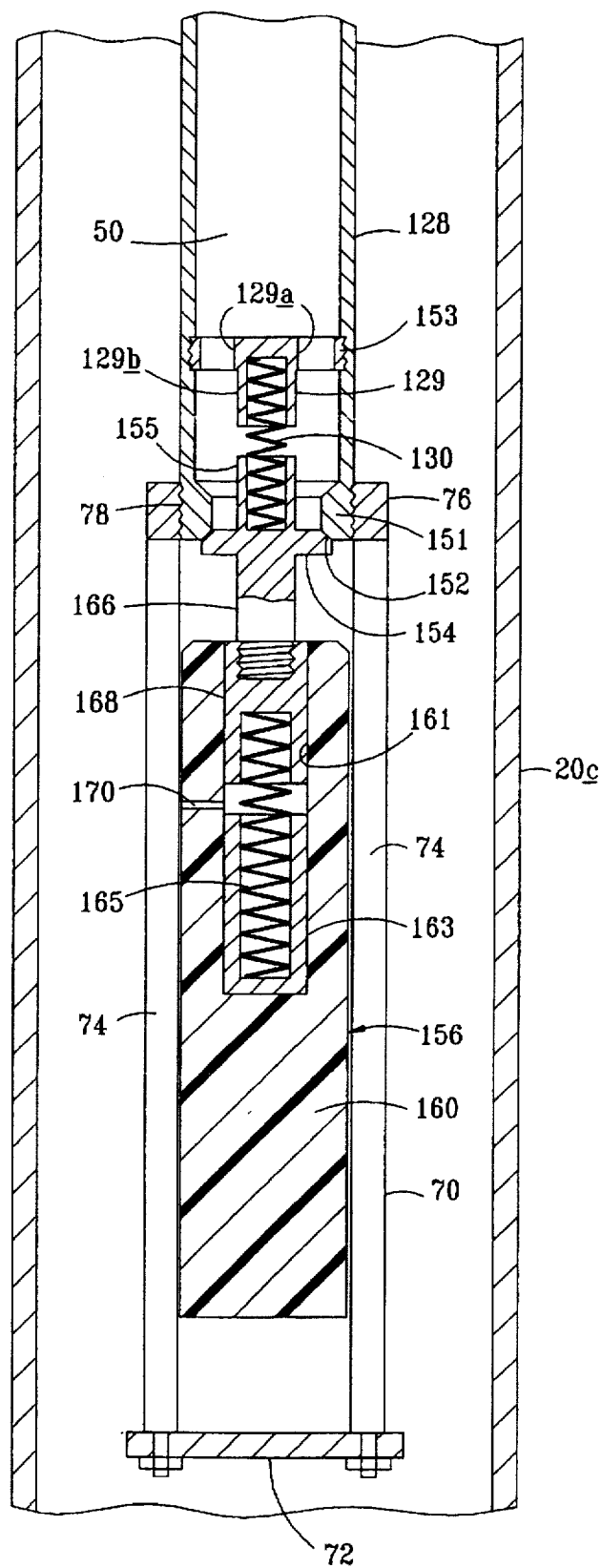
FIG. 4 is a longitudinal central section view of an alternate embodiment of a liquid carryover control mechanism in accordance with the invention.

Under some operating conditions, gas flow rates and pressure conditions may be such that, once the closure member 54 has been moved to a closed position, a pressure differential acting across the closure member will prevent the closure member from reopening even though the liquid level has subsided in conduit section 20c and buoyant forces have been removed from the actuator 56. FIG. 4 illustrates an alternate embodiment of an actuator and valve closure member in accordance with the invention which includes mechanism for biasing the closure member toward an open position to overcome gas pressure differential forces acting thereon when the closure member buoyant closing force has been removed. Referring to FIG. 4, a modified gas discharge conduit 128 is disposed in conduit section 20c, as illustrated, and includes a ported support member 129 having plural flow ports 129a formed therein and having an axially projecting hub 129b forming a support for a coil compression spring 130, as shown. The conduit section 128 is connected to a modified seat member 151 having a closure member seat surface 152 formed thereon. The member 151 is suitably secured to the discharge conduit section 128 at cooperating threads 153, for example. The modified float type actuator 156 includes a generally cylindrical float member 160 suitably retained by the cage 70 for axial sliding movement therein. The float member 160 is also formed of a suitable low density polymer material and is connected to a cylindrical poppet type closure member 154 which has an axially projecting spring support hub 155 formed thereon for journaling one end of the spring 130.

The closure member 154 is shown in FIG. 4 in its closed position in engagement with the seat 152 in response to buoyant forces acting on the float member 160 urging the closure member to a closed position in opposition to the biasing force of the spring 130. The effective area of the closure member 154 on which pressure differential forces are acting in the valve closed position may be determined for the expected gas pressures in the conduit section 20c to be such that, in combination with the buoyancy of the member 160 and the biasing force of the spring 130, a resultant force will act on the closure member 154 to move it to its closed position when liquid level in the conduit section 20c reaches a position which would result in carryover of liquid into the gas discharge conduit 128. Conversely, when the buoyancy forces are removed from the float member 160, a resultant force will act on the closure member 154 to move it to a valve open position, under the urging of the spring 130, in opposition to any gas pressure differential forces acting on the closure member. In this way, once the closure member 154 has moved to a closed position, any pressure differential acting across the closure member which would tend to hold it closed, even after the liquid level in conduit section 20c has subsided, will not prevent reopening of the closure member.

The actuator 156 is also provided with cushioning means for cushioning the impact of the closure member 154 against seat surface 152. The float member 160 includes an axial bore 161 formed therein and in which a suitable insert 163 is disposed and secured to the float member for journaling a coil compression spring 165. The closure member 154 includes an axial stem portion 166 which is secured to a cylindrical slide member 168 which is slidably disposed in the bore 161 and journals the opposite end of the spring 165. A suitable fluid vent port 170 is formed in the float member 160 and opens into the bore 161 for venting any liquid accumulating therein which would tend to prevent movement of the slide member relative to the float member 160 when the float member moves the closure member into engagement with the seat 152 and allows compression of the spring 165 to provide a cushioning effect to minimize impact forces exerted between the closure member and the seat surface.

The construction and operation of the separator system 10 is believed to be within the purview of one of ordinary skill in the art of such systems from the foregoing description. The separator system 10, including the liquid carryover control mechanism, may be constructed of conventional engineering materials used for handling hydrocarbon well production fluids and the like. The construction of the spiral or auger separator 22 may be carried out using the information available in U.S. Pat. No. 5,431,228, for example. When liquid slug flow is encountered in the separator system 10, liquid carryover into the gas discharge conduit 28 is minimized by the unique control mechanism comprising the closure member 54 and the actuator 56 therefor.

Installation of the separator system 10 may be carried out by interposing the separator system 10 in a multiphase fluid flow conduit and arranging the conduit sections 20 and 20c for substantially vertical disposition to enhance the operation of the actuators 56 or 156. Moreover, the gas discharge conduits 28 or 128 may be disposed downstream of the separator element 22 and flow through the gas discharge conduits conducted in the same direction as the flow through the liquid discharge conduit. In such an arrangement, the orientation of the separator system would preferably, be reversed from that shown in FIG. 1. That is, combined gas and liquid flow would be upward through the spiral separator section, gas would enter an inlet port in the gas discharge conduit and continue in the same general direction and the liquid carryover control would be responsive to liquid slugflow exiting the spiral separator element to close over the inlet to the gas discharge conduit. Other orientations of the gas discharge conduit and the separator section may be contemplated by those skilled in the art and as suggested in the disclosure of U.S. Pat. No. 5,431,228. The separator system 10 may be utilized in various applications and the illustrative example of the system shown in FIG. 1, although advantageous for handling well production fluid flow, is exemplary.

Although preferred embodiments of a liquid carryover controlled spiral separator system have been described in detail herein, those skilled in the art will recognize that various substitutions and modifications may be made to the system without departing from the scope and spirit of the invention as recited in the appended claims.

What is claimed is:

1. A spiral separator system for separating gas from liquid in a multiphase fluid flow stream comprising: an elongated conduit section having a spiral separator element interposed therein and constructed and arranged for effecting separation of gas from liquid to cause liquid flow generally along an inner wall of said conduit section and gas flow along a central part of said conduit section, an elongated gas discharge conduit interposed in said central part of said conduit section having a gas inlet, and a liquid carryover control mechanism operable to substantially close off said gas inlet of said gas discharge conduit to minimize liquid carryover into said gas discharge conduit during periods of high liquid level in the elongated conduit section.

2. The separator system set forth in claim 1 wherein:

said control mechanism comprises a closure member operable to engage a seat at said gas inlet of said gas discharge conduit and an actuator responsive to high liquid level in said conduit section to cause said closure member to shut off fluid flow through said gas discharge conduit.

3. The separator system set forth in claim 2 wherein:

said actuator comprises a float member operable to exert buoyant forces on said closure member in response to liquid accumulation in said conduit section.

4. The separator system set forth in claim 3 wherein:

said actuator includes means for biasing said closure member to on open condition in opposition to pressure differential forces acting across said closure member when buoyant forces have been removed from said float member.

5. The separator system set forth in claim 4 wherein:

said biasing means comprises a coil spring supported in said gas discharge conduit and engaged with said closure member.

6. The separator system set forth in claim 5 wherein:

said closure member comprises a generally cylindrical poppet member.

7. The separator system set forth in claim 1 wherein:

said separator system includes a liquid discharge conduit connected to said conduit section and to a flow meter for measuring liquid flow leaving said separator system.

8. The separator system set forth in claim 7 including:

a gas transmission conduit connected to said gas discharge conduit and a conduit interconnecting said liquid discharge conduit and said gas transmission conduit for combining the flow streams of gas and liquid separated by said separator system.

9. The separator system set forth in claim 7 including:

a gas discharge conduit connected to said conduit section and having a gas flow meter interposed therein.

10. A spiral separator system for separating gas from liquid in a multiphase fluid flowstream comprising:

a generally vertically extending, elongated conduit section for conducting a mixture of gas and liquid therethrough;

a spiral separator element interposed in said conduit section constructed and arranged for effecting separation of gas from liquid to cause liquid flow generally along an inner wall of said conduit section and gas flow along a central part of said conduit section;

a gas discharge conduit disposed in said central part of said conduit section and having an inlet adjacent a discharge end of said separator element; and a liquid carryover control mechanism comprising a closure member operable to close off said inlet of said gas discharge conduit to minimize liquid carryover into said gas discharge conduit, and an actuator including a float member operable to exert buoyant forces on said closure member to effect closure of said gas discharge conduit in response to liquid accumulation in said conduit section.

11. A spiral separator system for separating gas from liquid in a multiphase fluid flowstream emanating from a fluid production well, comprising:

an elongated, generally cylindrical conduit section;

a spiral separator element interposed in said conduit section constructed and arranged for effecting separation of gas from liquid to cause liquid flow generally along an inner wall of said conduit section and gas flow along a central axis of said conduit section;

a gas discharge conduit disposed along said central axis of said conduit section and having an inlet for receiving said gas flow; and a liquid carryover control mechanism operable to close off said inlet to said gas discharge conduit to minimize liquid carryover into said gas discharge conduit, said control mechanism including a closure member operable to engage a seat at said inlet of said gas discharge conduit and an actuator including a float member responsive to accumulation of liquid in said conduit section to effect movement of said closure member to shut off fluid flow to said gas discharge conduit.

12. A spiral separator system for separating gas from liquid in a multiphase fluid flow stream comprising an elongated conduit section having a spiral separator element interposed therein for effecting separation of gas from liquid to cause liquid flow generally along an inner wall of said conduit section and gas flow along a central part of said conduit section, an elongated gas discharge conduit interposed in said conduit section having a gas inlet, and a liquid carryover control mechanism operable to substantially close off said gas inlet of said gas discharge conduit to minimize liquid carryover into said gas discharge conduit during periods of high liquid; the level in the system and comprising a closure member operable to close said gas inlet, an actuator and shock absorber means interposed between said actuator and said closure member to cushion actuating forces acting on said closure member in response to high liquid level in said conduit section.

13. The separator system set forth in claim 12 wherein:

said inlet includes a seat and said shock absorber means includes a coil compression spring interposed between said actuator and a support part for said closure member for cushioning forces exerted by said actuator on said closure member to minimize impacting said closure member against said seat.

14. The separator system set forth in claim 13 wherein:

said actuator comprises a generally cylindrical housing including a buoyant material disposed therein and operable to support said support part in sleeved relationship for movement of said support part relative to said housing.

15. The separator system set forth in claim 14 wherein:

at least one of said housing and said support part includes a fluid conducting orifice formed therein for communicating pressure fluid between a cavity disposed between said housing and said support part in said conduit section.

16. The separator system set forth in claim 15 wherein:

said gas discharge conduit is disposed in a generally vertical position of an elongated central axis of said conduit section.

17. A spiral separator system for separating gas from liquid in a multiphase fluid flowstream comprising:
- a generally vertically extending, elongated conduit section for conducting a mixture of gas and liquid therethrough;
- a spiral separator element interposed in said conduit section for effecting separation of gas from liquid to cause liquid flow generally along an inner wall of said conduit section and gas flow along a central part of said conduit section;
- a gas discharge conduit disposed in said conduit section and having an inlet adjacent a discharge end of said separator element; and
- a liquid carryover control mechanism comprising a closure member operable to close off said inlet of said gas discharge conduit to minimize liquid carryover into said gas discharge conduit, and an actuator including a float member operable to exert buoyant forces on said closure member to effect closure of said gas discharge conduit in response to liquid accumulation in said conduit section and shock absorber means interposed between said float member and said closure member to cushion actuating forces on said closure member in response to liquid accumulation in said conduit section.

18. The separator system set forth in claim 17 wherein:
- said inlet includes a seat and
- said shock absorber means includes compression spring means interposed between said actuator and a support part for said closure member for cushioning forces exerted by said actuator on said closure member to minimize impacting said closure member against said seat.

* * * * *